United States Patent
Watson et al.

(10) Patent No.: US 6,804,893 B2
(45) Date of Patent: Oct. 19, 2004

(54) LASER LEVELING SYSTEM

(75) Inventors: James B. Watson, Fallston, MD (US); Lena J. Qin, Union City, CA (US); Karim Elkatcha, Sunnyvale, CA (US); Kimberly R. Capell, Fremont, CA (US); Luis F. Torres, San Jose, CA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/439,745

(22) Filed: May 16, 2003

(65) Prior Publication Data

US 2004/0093748 A1 May 20, 2004

(Under 37 CFR 1.47)

Related U.S. Application Data

(60) Provisional application No. 60/392,474, filed on Jun. 28, 2002.

(51) Int. Cl.[7] .............................................. G01C 15/06
(52) U.S. Cl. ........................................... 33/290; 33/286
(58) Field of Search ..................... 33/286, 290, 291, 33/292, 293, 296, 406, 809, DIG. 21; 254/13, 98, 103

(56) References Cited

U.S. PATENT DOCUMENTS

| | | | | |
|---|---|---|---|---|
| 887,994 A | * | 5/1908 | Betram ........................ 194/283 |
| 2,232,824 A | * | 2/1941 | Maher .......................... 33/809 |
| 3,117,378 A | * | 1/1964 | Bowen ......................... 33/293 |
| 3,277,579 A | * | 10/1966 | Murphy ........................ 33/372 |
| 3,522,658 A | * | 8/1970 | Howell ......................... 33/528 |
| 3,606,252 A | * | 9/1971 | Dorough, Jr. ............... 254/103 |
| 5,038,493 A | * | 8/1991 | Stabs ........................... 33/809 |
| 5,884,720 A | * | 3/1999 | Ackerman .................. 254/418 |
| 6,256,895 B1 | | 7/2001 | Akers |
| 6,299,138 B1 | * | 10/2001 | Huang et al. ............... 254/103 |
| 6,598,304 B2 | * | 7/2003 | Akers .......................... 33/286 |
| 2001/0037579 A1 | * | 11/2001 | Akers .......................... 33/286 |
| 2002/0017028 A1 | * | 2/2002 | Wishart ....................... 33/286 |
| 2002/0174552 A1 | * | 11/2002 | Akers .......................... 33/286 |
| 2003/0024772 A1 | * | 2/2003 | Naitoh ....................... 187/401 |
| 2003/0079356 A1 | * | 5/2003 | Crain et al. .................. 33/296 |

FOREIGN PATENT DOCUMENTS

| GB | 1 329 331 A | 9/1973 |
|---|---|---|
| GB | 2 234 008 A | 1/1991 |
| GB | 2 241 995 A | 9/1991 |

OTHER PUBLICATIONS

M. Passier, Partial European Search Report of Application No. EP 03 01 2688, Jul. 2, 2003, Munich.

* cited by examiner

Primary Examiner—G. Bradley Bennett
(74) Attorney, Agent, or Firm—Adan Avala (57) ABSTRACT

A leveling system including a first post for contacting an upper surface, a second post for contacting a lower surface, wherein one of the first and second posts telescopes within the other of the first and second posts, a locking assembly disposed on the one of the first and second posts, and a mount assembly for supporting a laser instrument.

13 Claims, 6 Drawing Sheets

LASER LEVELING SYSTEM

The present application derives priority from U.S. patent application Ser. No. 60/392,474, filed Jun. 28, 2002, now abandoned.

FIELD OF THE INVENTION

This invention relates generally to laser leveling system, apparatus and method particularly, adapted for use in construction projects, and more particularly for construction projects where it is necessary to position a variety of components of the building structure at various locations and at specific height locations (e.g. cabinets, bookshelves, countertops, etc.).

BACKGROUND OF THE INVENTION

There are numerous situations in the construction industry where it is necessary to ascertain elevation locations, and also to locate various components at precise elevations. This is a task that confronts surveyors, carpenters, brick layers, and others. For a number of decades, laser instruments have been utilized to establish locations and/or elevations.

Figure 1:
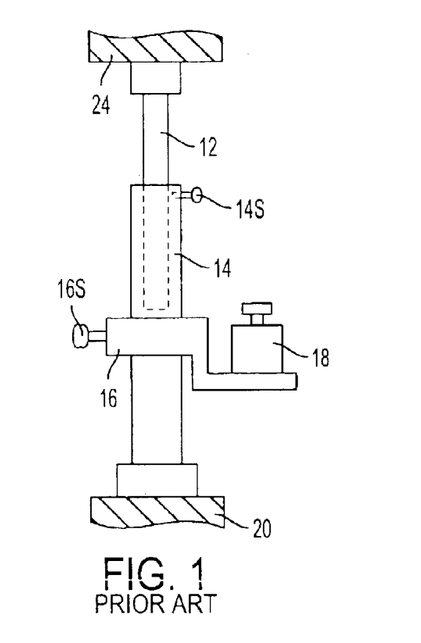
FIG. 1 is a side elevational view of a prior art leveling system.

U.S. Pat. No. 6,256,895 discloses a leveling system for such purpose. FIG. 1 shows a simplified version of the leveling system described in U.S. Pat. No. 6,256,895. For further information on the system, persons skilled in the art are referred to U.S. Pat. No. 6,256,895.

Referring to FIG. 1, the leveling system includes a lower post 14 disposed on floor 20, an upper post 12 slidably disposed within lower post 14 and contacting ceiling 24, a laser mounting section 16 slidably disposed on lower post 14, and a laser instrument 18 disposed on laser mounting section 16.

The laser mounting section 16 can move along the lower post 14. Once the exact position of the laser mounting section 16 (and of laser instrument 18) is selected, the user can lock the laser mounting section 16 and laser instrument in place by rotating a screw 16S.

In addition, upper post 12 can telescope within lower post 14. Accordingly, the overall height of the leveling system can be adjusted as necessary. The height is then fixed by rotating a screw 14S.

SUMMARY OF THE INVENTION

In accordance with the present invention, an improved leveling system is employed. The leveling system including a first post for contacting an upper surface, a second post for contacting a lower surface, wherein one of the first and second posts telescopes within the other of the first and second posts, a locking assembly disposed on the one of the first and second posts, and a mount assembly for supporting a laser instrument.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 7 illustrates a first embodiment of a mount assembly according to the invention, wherein

FIG. 8 illustrates a second embodiment of a leveling system according to the invention, where

FIG. 9 illustrates a third embodiment of a leveling system according to the invention, where FIG. 10 illustrates a second embodiment of the mount assembly according to the invention, where

DETAILED DESCRIPTION

The invention is now described with reference to the accompanying figures, wherein like numerals designate like parts. Persons skilled in the art are referred to U.S. Pat. No. 6,256,895, which is incorporated herein by reference.

Figure 2:
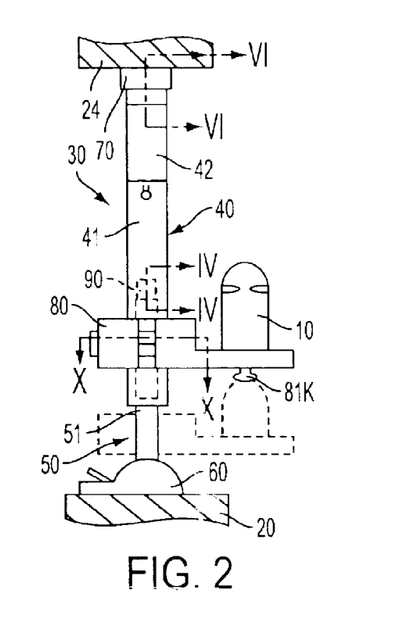
FIG. 2 is a side elevational of a first embodiment of a leveling system according to the invention.

Referring to FIG. 2, a leveling system 30 preferably includes an upper post assembly 40, a lower post assembly 50 slidably connected to upper post assembly 40, a locking assembly 90 disposed on lower post assembly 50, and a mount assembly 80 disposed on upper post assembly 40 and/or lower post assembly 50 for carrying a leveling instrument, such as laser instrument 10.

Upper post assembly 40 preferably contacts an upper surface, such as ceiling 24. Upper post assembly 40 may have a first post member 41, which is preferably tubular.

A second post member 42 may be threadingly attached to first post member 41 to extend the length of upper post assembly 40. It is preferable that second post member 42 have the same outer cross-section and/or diameter as first post member 41. Persons skilled in the art will recognize that the length of upper post assembly 40 may be extended by adding more post members or replacing the post members with longer members.

Figure 6:
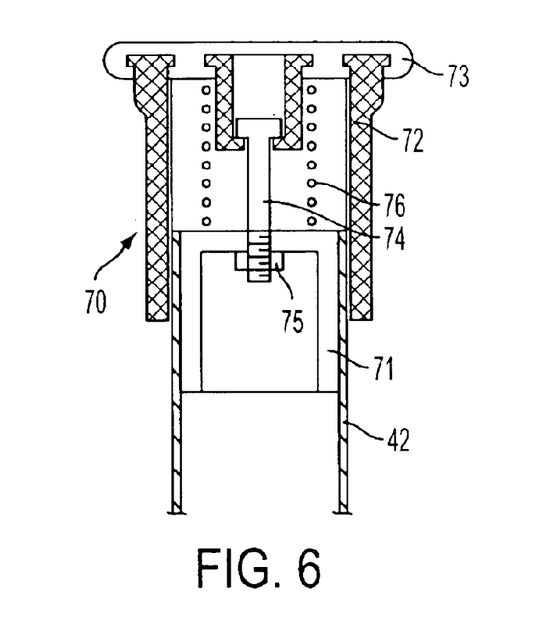
FIG. 6 is a partial cross-sectional view of an upper contact assembly along line VI—VI of FIG. 2.

A ceiling contact assembly 70 may be disposed on one end of the post member 41 or 42. Referring to FIGS. 2 and 6, the ceiling contact assembly 70 contacts an upper surface, such as a doorjamb or ceiling 24. Ceiling contact assembly 70 may have an insert 71, which is inserted into the post member 42, for connecting the ceiling contact assembly 70 to the post member.

Ceiling contact assembly 70 may also have a contact member 72 for contacting ceiling 24. Preferably, the contact member 72 has a portion 73 of a soft material, such as rubber, elastometer or thermoplastic, so that the ceiling 24 is not marred. Preferably, portion 73 is overmolded on contact member 72, though persons skilled in the art will recognize that portion 73 can be attached to contact member 72 in a variety of ways.

It is also preferable to allow contact member 72 to move relative to insert 71. This can be achieved by sandwiching contact member 72 and insert 71 between a bolt 74 and a nut 75. It is also preferable to provide a spring 76 between contact member 72 and insert 71 for biasing contact member 72 away from insert 71.

Persons skilled in the art will recognize that contact member 72 may slide over post member 42 in a telescoping action. Accordingly, the inner diameter of contact member 72 is preferably slightly larger than the outer diameter of post member 42.

As mentioned above, lower post assembly 50 is slidably connected to upper post assembly 40. Preferably, lower post assembly 50 telescopes within upper post assembly 40. Persons skilled in the art should recognize that upper post assembly 40 could telescope within lower post assembly 50 instead.

Figure 3:
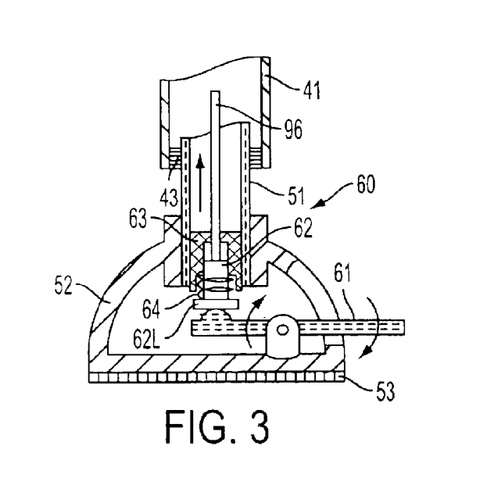
FIG. 3 is a partial cross-sectional view of an actuation assembly.

Referring to FIGS. 2–3, lower post assembly 50 preferably includes a post member 51, which is preferably tubular. In order to enhance the sliding action between upper and lower post assemblies 40, 50, it is preferable to provide pads or shims 43 on post member 41 for contacting post member 51. Preferably, the shims 43 are made of a slippery material, such as acetyl or UHMW propylene, etc.

In addition, lower post assembly 50 may include a foot member 52 for contacting a lower surface, such as floor 20. Foot member 52 may be threadingly or pressingly attached to post member 51.

Foot member 52 may have a contact portion 53 of a soft material, such as rubber, elastometer or thermoplastic, so that the floor 20 is not marred. Preferably, contact portion 53 is overmolded on foot member 52, though persons skilled in the art will recognize that contact portion 53 can be attached to foot member 52 in a variety of ways.

Figure 4:
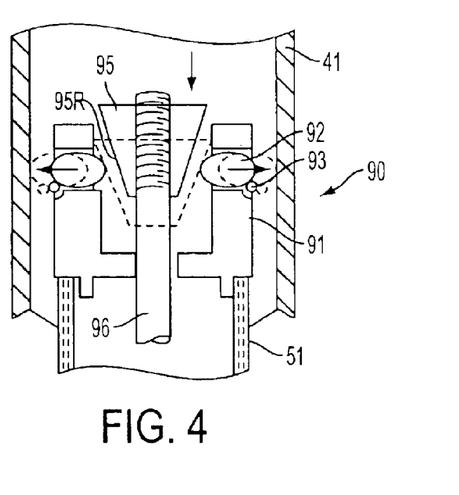
FIG. 4 is a partial cross-sectional view of a first embodiment of a locking assembly along line IV—IV of FIG. 2.
Figure 5:
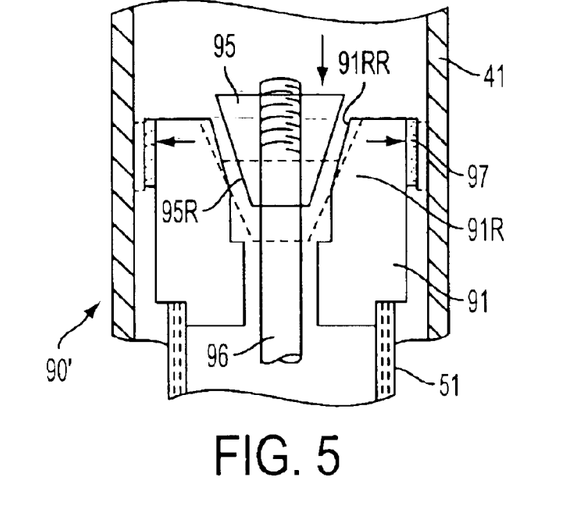
FIG. 5 is a partial cross-sectional view of a second embodiment of a locking assembly along line IV—IV of FIG. 2.

Referring to FIGS. 2 and 4–5, a locking assembly 90 is provided on the lower post assembly 50. Locking assembly 90 preferably locks the position of upper post assembly 40 relative to lower post assembly 50.

Referring to FIG. 4, locking assembly 40 preferably includes an insert 91 disposed on post member 51. Insert 91 carries locking members 92, which may be made of metal. Locking members 92 may be substantially spherical or bullet-shaped. Locking members 92 may be moved between locking and unlocked positions. In the embodiment of FIG. 4, the locking position preferably occurs when locking members 92 contact the inside wall of post member 41. On the other hand, the unlocked position preferably occurs when locking members 92 do not contact the inside wall of post member 41.

It is preferable to provide a means to bias locking members 92 towards the unlocked position. This could be achieved by a spring or an O-ring 93, etc. Persons skilled in the art, however, should recognize that locking members 92 could be biased instead towards the locking position.

In addition, it is preferable to provide a means to limit the travel of locking members 92, so that they do not escape. This could be achieved by trapping locking members 92 within insert 91. Alternatively, O-ring 93 can limit the travel.

Locking members 92 may be moved towards the locking position via wedge member 95, which preferably has a ramp 95R that contacts and displaces locking members 92 as wedge member 95 is moved in one direction. In the embodiment of FIG. 4, when wedge member 95 is moved downwardly, wedge member 95 moves locking members 92 outwardly towards the locking position. However, persons skilled in the art should recognize that the same result could be achieved if wedge member 95 is designed so that it moves locking members 92 outwardly towards the locking position when wedge member 95 is moved upwardly.

Wedge member 95 is preferably threadingly engaged to rod 96, which transmits the motion from the actuation assembly 60, as discussed below. With such arrangement, when rod 96 is moved downwardly, wedge member 95 also moves downwardly, thus moving locking members 92 outwardly towards the locking position. When rod 96 is moved upwardly, wedge member 95 also moves upwardly. This allows O-ring 93 to return locking members 92 inwardly towards the unlocked position.

Another embodiment of locking assembly 90' is shown in FIG. 5, where like parts refer to like numerals. The main difference is that locking portions 91R of insert 91, rather than locking members 92, contact the inner wall of post member 41. Locking portions 91R are preferably made of a resilient material, so that they can return to the unlocked position as the force from wedge member 95 against locking portions 91R is reduced. In addition, locking portions 91R may have ramps 91RR that contact ramp 95R.

Preferably, the locking portions 91R have a contact portion 97 of a soft material, such as rubber, elastometer or thermoplastic. Preferably, contact portion 97 is overmolded on locking portions 91R, though persons skilled in the art will recognize that contact portion 97 can be attached to locking portions 91R in a variety of ways.

Persons skilled in the art will recognize that it is preferable to provide locking assembly 90 on the one post assembly telescoping within the other post assembly. In other words, if the upper post assembly 40 telescopes within lower post assembly 50, it is preferable to provide locking assembly 90 on the upper post assembly 40, rather than on the lower post assembly 50.

However, persons skilled in the art will also recognize that the locking assembly 90 may be provided on the outer post assembly, by making the contacting portion of locking assembly 90 move towards the post assembly telescoped within the outer post assembly. In other words, if the upper post assembly 40 telescopes within lower post assembly 50, locking assembly 90 may be disposed on lower post assembly 50 and may have portions that move towards upper post assembly 40.

As mentioned above, rod 96 transmits the motion from the actuation assembly 60 to the wedge member 95. Referring to FIG. 3, actuation assembly 60 may include a pedal 61, which is preferably pivotably attached to foot member 52. One end of pedal 61 may contact a cylinder 62 attached to the end of rod 96. Accordingly, when pedal 61 is pressed, pedal 61 pushes rod 96 upwardly.

It is preferable to limit the travel of rod 96. This may be achieved by providing an insert 63 at the end of post member 51. Cylinder 62 may have a ledge 62L which contacts insert 63 at the travel range limit.

A spring 62 may be disposed between insert 63 and cylinder 62 to bias rod 96 downwardly.

With such arrangement, when pedal 61 is pressed, pedal 61 pushes rod 96 upwardly, thus moving wedge member 95 upwardly. O-ring 93 in turn moves locking members 92 inwardly towards the unlocked position, allowing the user to move upper post assembly 40 relative to lower post assembly 50. When the desired position is obtained, the user need only step off pedal 61. Gravity and/or spring 62 then move rod 96 and wedge member 95 downwardly. Wedge member 95 in turn moves locking members 92 outwardly towards the locking position, thus fixing the position of upper post assembly 40 relative to lower post assembly 50.

Persons skilled in the art will recognize that it is preferable to provide actuation assembly 60 on the same post assembly carrying locking assembly 90. In other words, if the upper post assembly 40 carries locking assembly 90, it is preferable to provide actuation assembly 60 on the upper post assembly 40, rather than on the lower post assembly 50.

As mentioned above, a mount assembly 80 may be disposed on upper post assembly 40 and/or lower post assembly 50 for carrying a leveling instrument. Referring to FIGS. 2 and 7, mount assembly 80 has a platform 81, and a clamp assembly 82 connected to platform 81.

Platform 81 preferably supports a leveling instrument, such laser instrument 10, which could be a rotary laser, a plumb bob, box lasers, etc. Platform 81 may have a hole 81H for receiving a screw therethrough. The screw is preferably threadingly engaged to laser instrument 10 at one end, and has a knob 81K at the other end, for rotating the screw into and out of engagement with laser instrument 10.

A clamp assembly 82 is connected to platform 81. Clamp assembly 82 preferably connects platform 81 to upper post assembly 40 and/or lower post assembly 50. It is preferred that clamp assembly 82 be designed so that it can slide along the length of upper post assembly 40 and/or lower post assembly 50.

Clamp assembly 82 may include a first clamp portion 83 and a second clamp portion 84 attached the first clamp portion 83. Preferably, the second clamp portion 84 is pivotally attached the first clamp portion 83 via a hinge 82H. First clamp portion 83 may be connected to or formed integrally with platform 81. A knob 85 may be pivotally connected to the first clamp portion 83 via a pin 83P.

For clamping, the knob 85 is pivoted within a slot 84S on second clamp portion 84, then rotated. The rotation of knob 85 brings the first and second clamp portions 83, 84 closer together, pinching, for example, post member 41. To unclamp, the user need only to loosen knob 85.

With such arrangement, the user can move the mount assembly 80 (and thus the laser instrument 10 mounted on platform 81) to a desired height on upper post assembly 40, then fix the location of mount assembly 80 by tightening knob 85. Afterwards, to change the height, the user would loosen knob 85, move the mount assembly 80 to the new desired height, and fix the location by tightening knob 85.

The mount assembly 80 can easily be removed from the upper post member by loosening knob 85, pivoting knob 85 out of slot 84S, then rotating the second clamp portion 84 relative to the first clamp portion 83.

It is desirable to allow mount assembly 80 to be disposed on both upper and lower post assemblies 40, 50. Such ability would increase the range of the locations the mount assembly 80 can be placed at. However, in the present design, the upper and lower post assemblies 40, 50 have different widths or diameters. It is thus desirable to provide mount assembly 80 with an adjustment mechanism 86 that would allow the mount assembly 80 to clamp on at least two different widths.

Adjustment mechanism 86 may be disposed on the first and/or second clamp portions 83, 84. Adjustment mechanism 86 may include a body 86B, protrusions 86P extending from the body 86B, and a knob 86K attached to the body 86B for moving the body 86B and protrusions 86P.

Figure 7A:
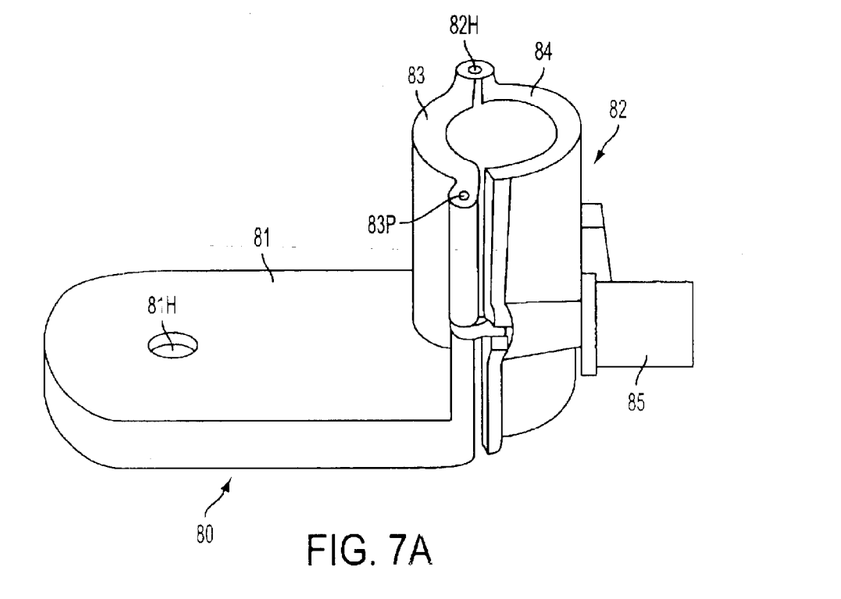
FIGS. 7A–7B are perspective views showing the mount assembly in open and closed positions, respectively.
Figure 7B:
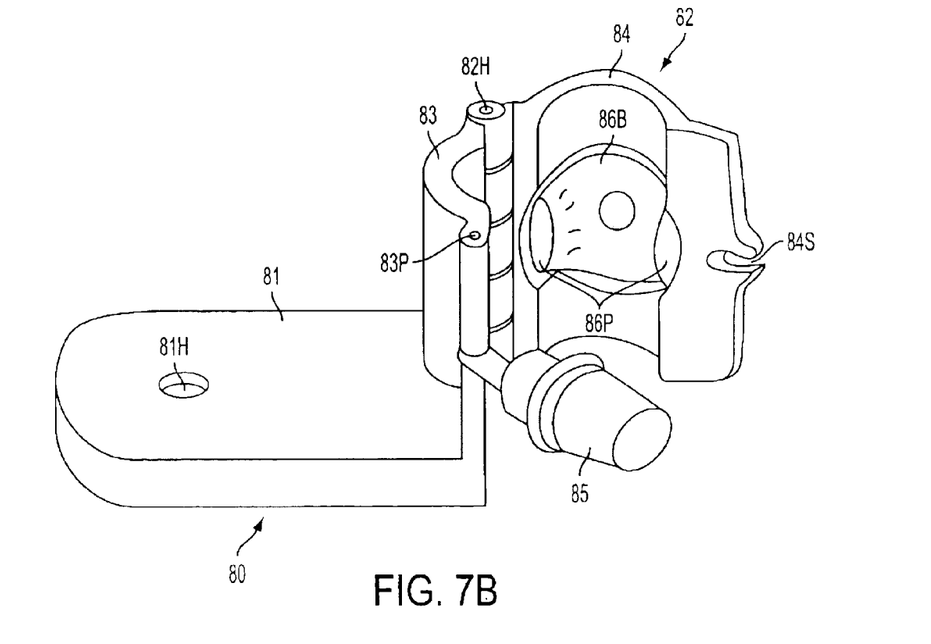
Figure 7C:
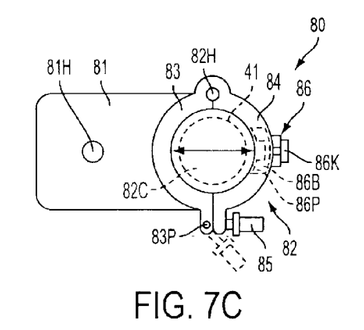
FIGS. 7C–7D are top plan views showing the mount assembly in the wide and narrow diameter configurations, respectively.
Figure 7D:
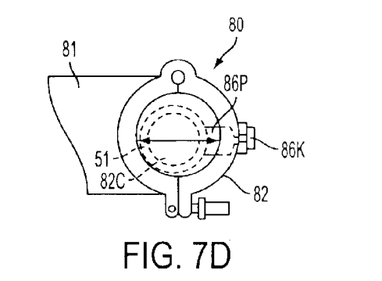

The adjustment mechanism 86 preferably has two positions: a wide setting (shown in FIG. 7C) and a narrow setting (shown in FIG. 7D). Knob 86K can be used for moving or rotating body 86B and protrusions 86P between the two settings.

In the narrow setting, the protrusions 86P extend into the channel 82C defined by the first and second clamp portions 83, 84. Because of this, the mount assembly 80 can be mounted on a first post member, e.g., post member 51, having a first width that is narrower than the width of channel 82C. In the wide setting, the protrusions 86P do not extend into channel 82C as far as in the narrow setting, and are preferably nested within second clamp portion 84. Thus, the mount assembly 80 can be mounted on a second post member, e.g., post member 41, having a second width that is greater than the first width.

FIG. 10 illustrates a second embodiment of the mount assembly 80', where like numerals refer to like parts. The main difference is that mount assembly 80' does not have an adjustment mechanism 86 as the previous embodiment.

Instead, the second clamp portion 84 may be provided with at least two areas of different radii. Preferably, second clamp portion 84 may have a first area 84N having a curvature with a small radius R1 between two areas 84W, each having a curvature with wider radius R2. In addition, the first clamp portion 83 may have an area 83W having a curvature with the wider radius R2.

Persons skilled in the art will recognize that the radii R1, R2 can be selected so that they are substantially equal to the radii of the upper and lower post members 40, 50. For example, if the radii of post members 41, 51 are about 1.5 inches and about 2 inches, respectively, the radii R1, R2 will also be about 1.5 inches and about 2 inches, respectively.

Figure 10A:
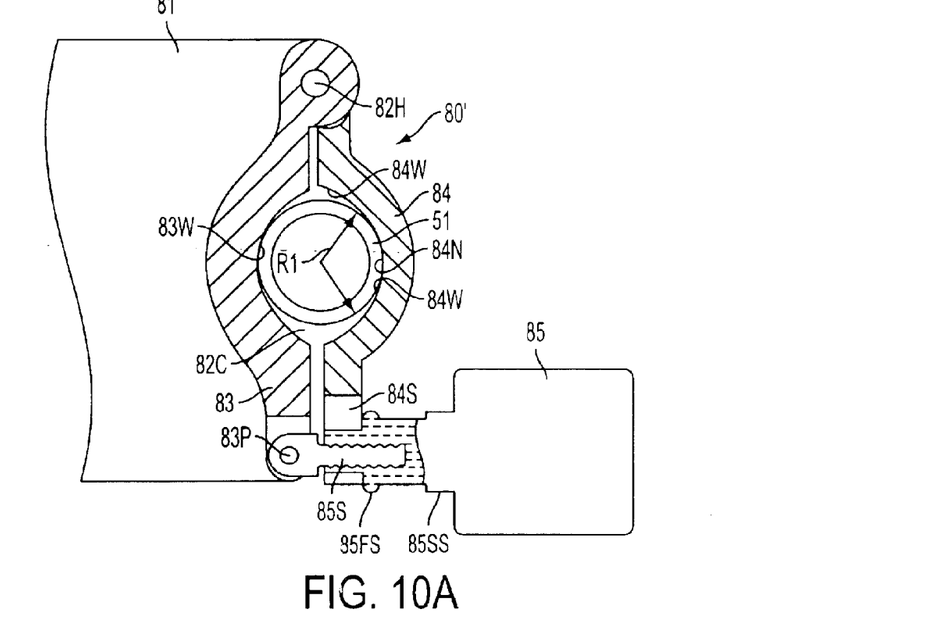
FIGS. 10A–10B are cross-sectional views of the mount assembly in the narrow and wide diameter configurations, respectively, where the cross-sectional views are taken along line X—X of FIG. 2.
Figure 10B:
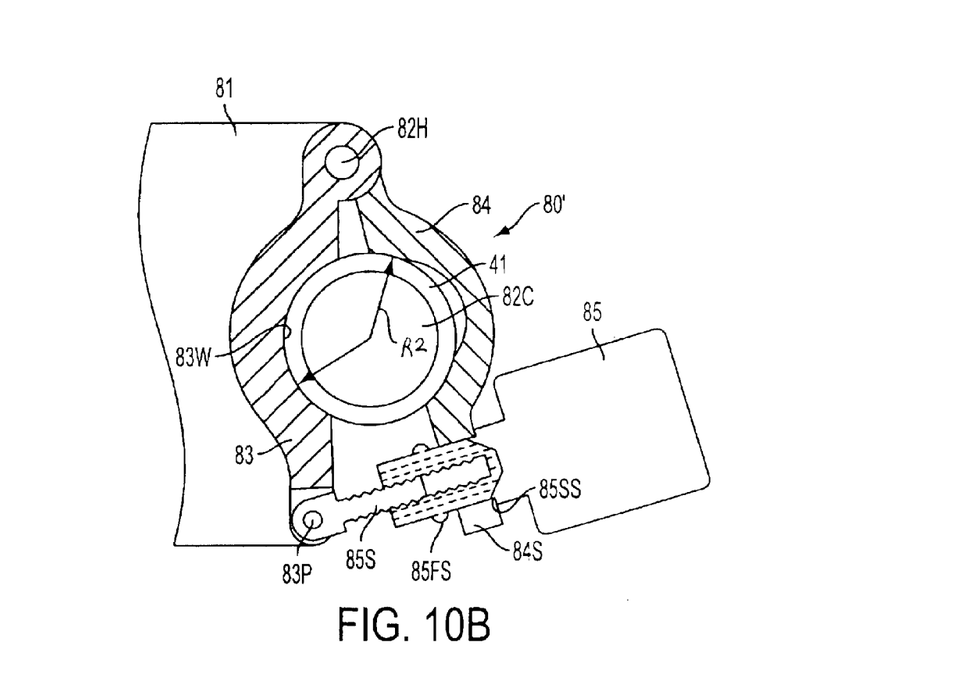

With such arrangement, mount assembly 80' will clamp onto post members having at least two different widths. As shown in FIG. 10A, post member 51 will contact area 84N, as well as some portions of area 83W. On the other hand, post member 41 will contact areas 83W, 84W, as shown in FIG. 10B.

Like in the previous embodiment, the knob 85 is pivoted within a slot 84S on second clamp portion 84, then rotated. The rotation of knob 85 brings the first and second clamp portions 83, 84 closer together, pinching, for example, post member 41. To unclamp, the user need only to loosen knob 85.

Preferably, knob 85 is threadingly engaged to shaft 85S, which is pivotally attached to first clamp portion 83 via pin 83P. In particular, knob 85 has a first shoulder 85FS that contacts second clamp portion 84 when clamping the narrower member (see FIG. 10A). Knob 85 may also have a second shoulder 85SS that contact second clamp portion 84 when clamping the wider member (see FIG. 10B).

Persons skilled in the art will recognize that knob 85 can clamp mount assembly 80' with only one shoulder. However, it is preferable to provide a second shoulder so that the user need not rotate knob 85 as much.

Figure 8A:
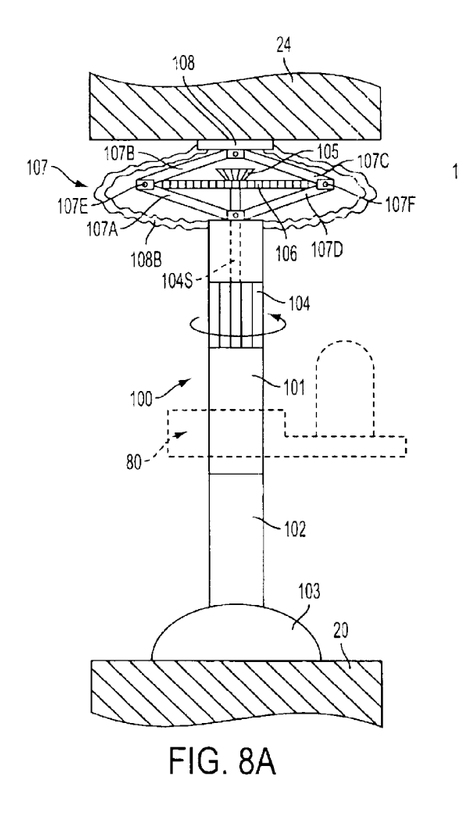
FIGS. 8A–8B show the leveling system in low and high height configurations, respectively.
Figure 8B:
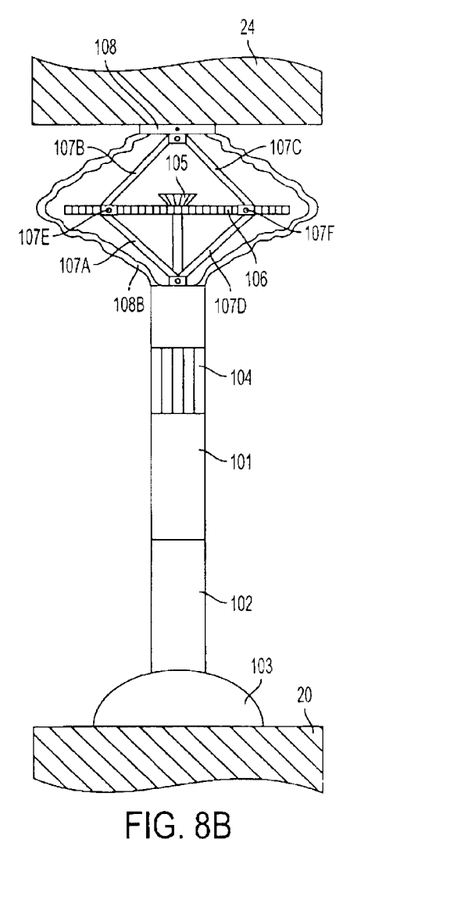

FIG. 8 illustrates a second embodiment of the leveling system, where like numerals refer to like parts. All the teachings of the above-discussed embodiment are incorporated herein by reference.

Leveling system 100 may have an upper post member 101, a lower post member 102 connected to upper post member 101, a foot portion 103 connected to lower post member 102, and a mount assembly 80 disposed on upper post member 101 and/or lower post member 102, the mount assembly 80 carrying a leveling instrument. Preferably, upper post member 101 is threadingly engaged to lower post member 102. Further post members may be disposed between upper and lower post members 101, 102 to increase the overall height of leveling system 100.

The upper post member 101 may have a grip portion 104 that can be rotated by the user. The grip portion 104 in turn is connected to a shaft 104S, which in turn is connected to a worm gear 105. Worm gear 105 meshes with a screw 106, which may be threadingly engaged to a quadrilateral linkage 107. Quadrilateral linkage has two lower links 107A, 107D pivotally attached to each other, which in turn are respectively pivotally attached to two upper links 107B, 107C at pivotal connections 107E, 107F, respectively. Upper links 107B, 107C are pivotally attached to contact portion 108. Lower links 107A, 107D may be slidably attached to shaft 104S.

Preferably, screw 106 threadingly engages the pivotal connections 107E, 107F. Accordingly, when shaft 104S is rotated, worm gear 105 and screw 106 rotate, causing pivotal connections 107E, 107F to move closer. As pivotal connections 107E, 107F to move closer, the quadrilateral linkage 107 becomes taller, until contact portion 108 contacts ceiling 24.

Preferably, a bellows 108B covers the quadrilateral linkage 107 to prevent the user from pinching his or her fingers therein.

Figure 9A:
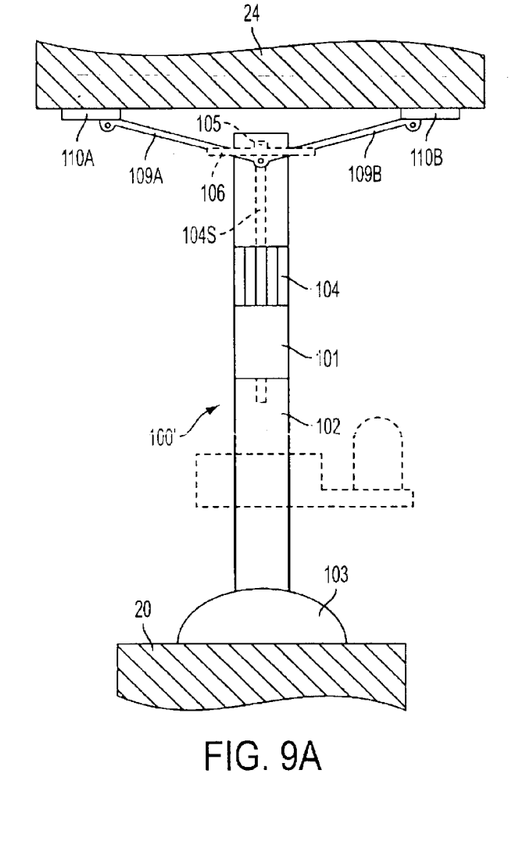
FIGS. 9A–9B show the leveling system in low and high height configurations, respectively.
Figure 9B:
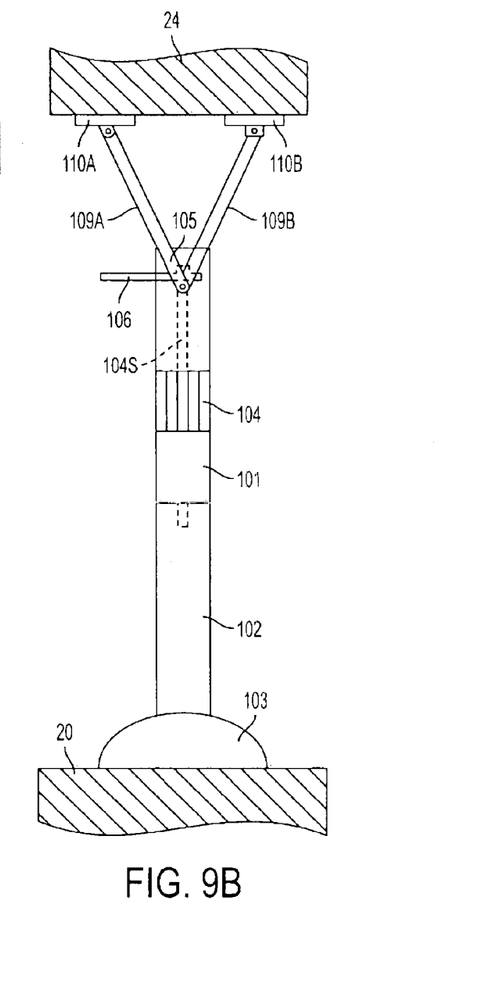

FIG. 9 illustrates a third embodiment of the leveling system, where like numerals refer to like parts. All the teachings of the above-discussed embodiments are incorporated herein by reference.

The main difference from the embodiment of FIG. 8, is that a quadrilateral linkage is not used. Instead, screw 106 threadingly engage links 109A, 109B, which in turn are pivotally connected to contact portions 110A, 110B, respectively. Accordingly, when shaft 104S is rotated, worm gear 105 and screw 106 rotate, causing links 109A, 109B to move closer. As links 109A, 1019B to move closer, they also become taller, until contact portions 110A, 110B contact ceiling 24.

Persons skilled in the art will recognize that, in the embodiments of FIGS. 8–9, grip portion 104 can be replaced by a ratcheting mechanism connected to a pedal, so that the user can press the pedal to rotate shaft 104S.

Persons skilled in the art may recognize other additions or alternatives to the means disclosed herein. However, all these additions and/or alterations are considered to be equivalents of the present invention.

What is claimed is:

1. A leveling system comprising:
    a first post for contacting an upper surface;
    a second post for contacting a lower surface, wherein one of the first and second posts telescopes within the other of the first and second posts;
    a locking assembly disposed on the one of the first and second posts, the locking assembly comprising a locking element movable between a first position contacting the other of the first and second posts, and a second position not contacting the other of the first and second posts, a member contacting the locking element for moving the locking element between the second and first positions, and a resilient element contacting the locking element for biasing the locking element to the second position; and
    a mount assembly for supporting a laser instrument;
    wherein the member is movable via a pedal disposed on the second post.

2. The system of claim 1, wherein the member is a wedge.

3. The system of claim 1, wherein the locking member contacts an inner wall of the other of the first and second posts.

4. The system of claim 1, wherein the resilient element is a ring disposed around the locking element.

5. A leveling system comprising:
    a first post for contacting an upper surface, the first post having a first diameter;
    a second post for contacting a lower surface, the second post having a second diameter, wherein the first and second diameters are unequal; and
    a mount assembly for supporting a laser instrument, the mount assembly being disposable and lockable on both first and second posts, the mount assembly comprising a platform for supporting the laser instrument, a first clamp portion connected to the platform, a second clamp portion connected to at least one of the platform and the first clamp portion, the first and second defining a channel therebetween for receiving at least one of the first and second posts, a shaft sandwiching the other of the first and second clamp portions between the knob and the one of the first and second clamp portions.

6. The leveling system of claim 5, wherein the shaft is pivotally connected to the one of the first and second clamp portions.

7. The leveling system of claim 5, wherein the mount assembly further comprises an adjustment mechanism disposed on at least one of the first and second clamp portions, the adjustment mechanism comprising a protrusion movable into the channel.

8. The leveling system of claim 7, wherein the adjustment mechanism further comprises a knob for moving the protrusion.

9. The leveling system of claim 7, wherein the protrusion is movable between a first position within the channel and a second position outside the channel.

10. A leveling system comprising:
    a first post for contacting a lower surface;
    a mount assembly disposed on the first post for supporting a laser instrument;
    a first screw disposed on the first post;
    a worm gear connected to the first screw;
    a second screw meshing with the worm gear;
    first and second links connected to the second screw; and
    a first contact portion for contacting an upper surface, the first contact portion connected to the first link.

11. The leveling system of claim 10, further comprising a second contact portion for contacting the upper surface, the second contact portion connected to the second link.

12. The leveling system of claim 10, wherein the first contact portion is connected to the first link via a third link, and the first contact portion is connected to the second link via a fourth link.

13. The leveling system of claim 10, further comprising a grip portion disposed on the first portion, the grip portion being connected to the first screw, so that a user can rotate the first screw by rotating the grip portion.

* * * * *